United States Patent [19]

Nakano

[11] Patent Number: 4,928,542
[45] Date of Patent: May 29, 1990

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 313,418

[22] Filed: Feb. 22, 1989

[30] Foreign Application Priority Data

Feb. 23, 1988 [JP] Japan .................................. 63-39813

[51] Int. Cl.$^5$ ............................................. F16H 15/38
[52] U.S. Cl. ......................................... 74/200; 74/201
[58] Field of Search ................................. 74/200, 201

[56] References Cited

U.S. PATENT DOCUMENTS

| | | | |
|---|---|---|---|
| 744,550 | 11/1903 | Hoffman | 74/200 |
| 817,239 | 4/1906 | Graves | 74/201 |
| 2,073,134 | 3/1937 | Almen et al. | 74/200 |
| 2,646,696 | 7/1953 | Kepes | 74/200 |
| 3,371,546 | 3/1968 | Spangler et al. | 74/200 |

FOREIGN PATENT DOCUMENTS

61-116166  6/1986  Japan .

OTHER PUBLICATIONS

Kraus et al., "A Continuously Variable Transmission for Automotive Fuel Economy", Society of Automotive Engineers, Inc., Paper 751180, 2 pages.

Carson, "New and Better Traction Drives are Here", Machine Design, Apr. 18, 1974.

Primary Examiner—Allan D. Herrmann
Assistant Examiner—Janice E. Chartoff
Attorney, Agent, or Firm—Foley & Lardner, Schwartz, Jeffery, Schwaab, Mack, Blumenthal & Evans

[57] ABSTRACT

Herein disclosed is a continuously variable traction roller transmission of a double cavity type. The transmission comprises a casing; a partition wall installed in the casing to define front and rear cavities in the same; a first shaft extending through the front and rear cavities; first and second motion transmitting traction mechanisms respectively installed in the front and rear cavities, each mechanism being disposed about the first shaft and operatively connected to the same; first and second control valve body structures respectively installed in the front and rear cavities, each structure producing a hydraulic pressure for controlling the corresponding motion transmitting traction mechanism; a second shaft extending through only the rear cavity; and a mechanism for operatively connecting the second shaft to both of the first and second motion transmitting traction mechanisms. The second control valve body structure has a passage through which the second shaft is passed.

11 Claims, 2 Drawing Sheets

CONTINUOUSLY VARIABLE TRACTION ROLLER TRANSMISSION

BACKGROUND OF THE INVENTION

1. Field of the Invention

The present invention relates in general to continuously variable traction roller transmissions, and more particularly to the transmissions of a double cavity type which has on a common axis two sets of motion transmitting traction mechanisms.

2. Description of the Prior Art

Japanese Patent First Provisional Publication 61116166 shows one continuously variable traction roller transmission having motion transmitting traction rollers disposed between, and in engagement with, opposite toroidal discs mounted on input and output shafts. Under operation of the transmission, the torque applied to the input toroidal disc from a prime mover is transmitted through the traction rollers to the output toroidal disc.

During this, the rotation speed change ratio between the input and output toroidal discs is infinitely varied depending on the angle at which each traction roller inclines relative to the common axis on which the input and output toroidal discs are mounted.

In order to avoid slippage between each traction roller and the input and output toroidal discs, a biasing device is employed by which the mutually engaging roller and disc are biased toward each other. The biasing device is controlled by a controller in such a manner that the biasing force is varied in proportion to a torque applied to the input toroidal disc. Usually, a disc spring is used for the biasing device, and loading cams are used for the controller.

Thus, when a large torque transmitting is required, it becomes necessary to provide the transmission with a stronger and thus large-sized biasing device. In this case, however, the entire construction of the transmission becomes large in size, particularly, in the size in radial direction.

In order to solve this drawback, there has been proposed a so-called double cavity type transmission which has on a common axis two sets of motion transmitting traction mechanisms. This type of transmission is shown in the Publication entitled "Machine Design" published on Apr. 18, 1974 and SAE (Society of Automotive Engineers, Inc.) Paper 751180. That is, by bearing the input torque by the two motion transmitting traction mechanisms, each mechanism is allowed to have a small size particularly in radial direction thereby permitting reduction in radial size of the entire construction of the transmission. As is known, reduction in size of automotive parts is quite advantageous in the manufacturing of motor vehicles.

In fact, in the transmission of such type, the input and output shafts are arranged in parallel and the two sets of motion transmitting traction mechanisms are arranged at the output shaft side. The input and output shafts extend throughout the entire internal length of the casing of the transmission.

However, due to the inherency of the above-mentioned arrangement of the input and output shafts, it is difficult to provide the interior of the casing with a sufficient space for accommodating any parts. Thus, hitherto, a control valve used for controlling the motion transmitting traction mechanisms has been mounted outside of the transmission casing. Thus, in spite of employing the double cavity structure, the attempt to reduce the size of the transmission has been far from satisfactory.

SUMMARY OF THE INVENTION

It is therefore an essential object of the present invention to provide a double cavity type continuously variable traction roller transmission which is compact in size.

According to the present invention, there is provided a double cavity type continuously variable traction roller transmission which has therein a sufficient space for accommodating a control valve structure.

According to the present invention, there is provided a continuously variable traction roller transmission of a double cavity type which comprises a casing; a partition wall installed in the casing to define front and rear cavities in the same; a first shaft extending through the front and rear cavities; first and second motion transmitting traction mechanisms respectively installed in the front and rear cavities, each mechanism being disposed about the first shaft and operatively connected to the same; first and second control valve body structures respectively installed in the front and rear cavities, each structure producing a hydraulic pressure for controlling the corresponding motion transmitting traction mechanism; a second shaft extending through only the rear cavity; and means for operatively connecting the second shaft to both of the first and second motion transmitting traction mechanisms, wherein the second control valve body structure has a passage through which the second shaft is passed.

DETAILED DESCRIPTION OF THE INVENTION

Figure 1:
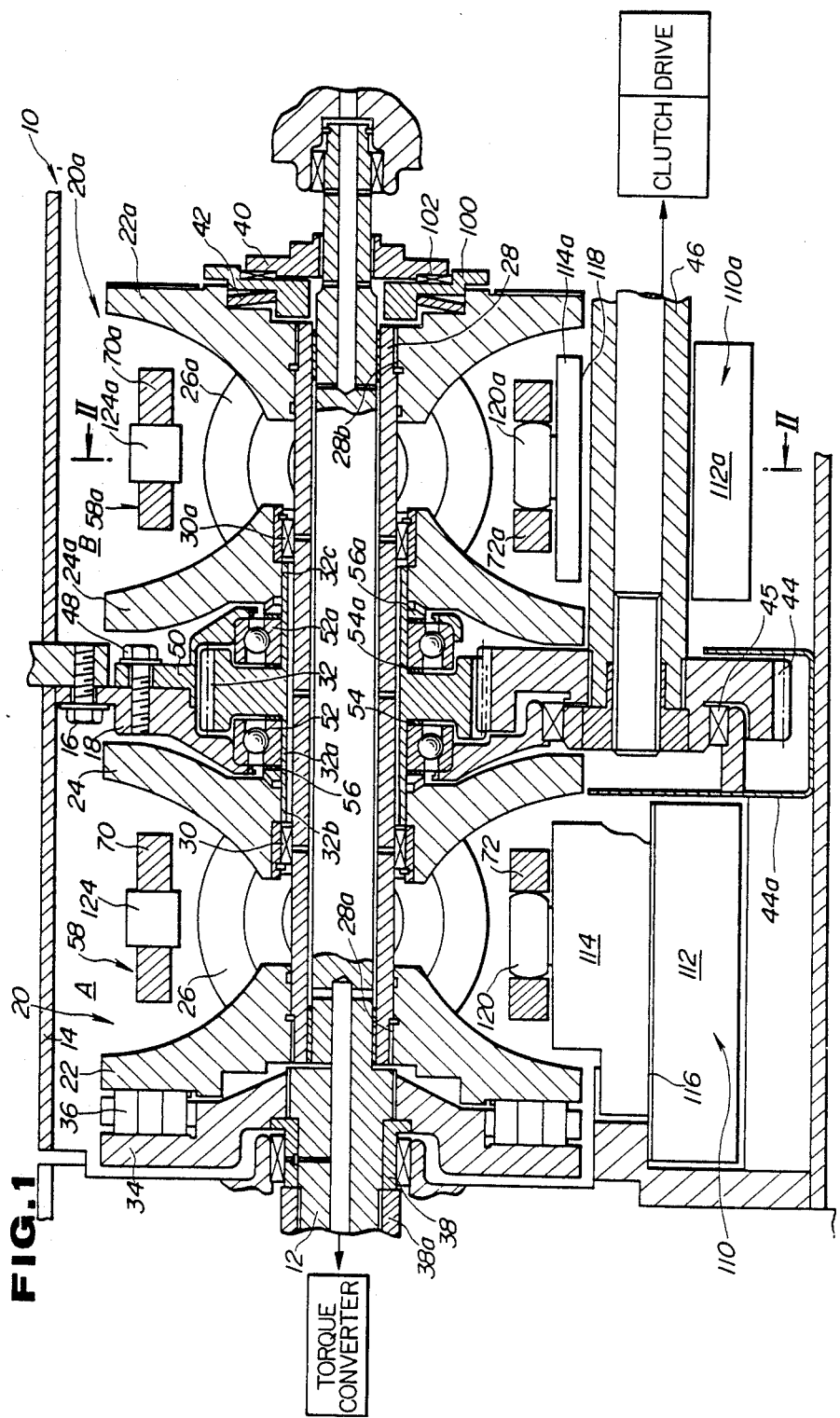
FIG. 1 is a sectional view of an essential portion of a double cavity type continuously variable traction roller transmission according to the present invention.

Referring to the drawings, particularly, FIG. 1, there is shown a double cavity type continuously variable traction roller transmission according to the present invention, which is generally designated by numeral 10. A torque converter (not shown) is arranged at left side, as viewed in FIG. 1, of the transmission 10. Designated by numeral 12 is an input shaft (or first shaft) which extends from the torque converter. The input shaft 12 is rotatably held by a casing 14. A known measure is employed for permitting a slight axial movement of the input shaft 12 relative to the casing 14 for the reason as will become apparent as the description proceeds. Designated by numeral 18 is a partition wall which is secured by bolts 16 to the casing 14 thereby defining front and rear cavities A and B in the casing 14.

First and second motion transmitting traction mechanisms 20 and 20a are installed in the front and rear cavities A and B respectively and they are coaxially arranged.

The first mechanism 20 comprises a first input toroidal disc 22, a first output toroidal disc 24 arranged opposite to the first input toroidal disc 22, and first paired traction rollers 26 which are disposed between and in engagement with the input and output toroidal discs 22 and 24. Similar to this, the second mechanism 20 comprises a second input toroidal disc 22a, a second output toroidal disc 24a and second paired traction rollers 26a.

The paired traction rollers 26 or 26a are inclinable relative to the commom axis of the toroidal discs 22 and 22a (or, 24 and 24a), so that speed change ratio between the input and output toroidal discs 22 and 22a (or, 24 and 24a) is infinitely varied depending on the angle at which the traction rollers incline relative to the common axis. As will be clarified hereinafter, the first input and output toroidal discs 22 and 24 and the second input and output toroidal discs 22a and 24a are disposed on a common axis.

In the present invention, the first and second output toroidal discs 24 and 24a are arranged close to each other in a back-to-back manner with an interposal of the partition wall 18 therebetween, while the first and second input toroidal discs 22 and 22a are arranged at a distance from each other.

The first and second input toroidal discs 22 and 22a are connected through serrations 28a and 28b to front and rear ends of a torque shaft 28 which is rotatably disposed about the input shaft 12.

The first and second output toroidal discs 24 and 24a are rotatably disposed about the torque shaft 28 through respective needle bearings 30 and 30a. An output gear 32 is rotatably disposed about the torque shaft 12 at a position between the first and second output toroidal discs 24 and 24a. The output gear 32 has front and rear hub portions 32a to which the first and second output toroidal discs 24 and 24a are connected through serrations 32b and 32c.

Thus, the first and second input toroidal discs 22 and 22a are connected through the torque shaft 28 to rotate together, while, the first and second output toroidal discs 24 and 24a are connected through the hub portions 32a of the output gear 32 to rotate together.

At an axially outer side of the first input toroidal disc 22, there is arranged a cam flange 34 which is connected through serrations (no numeral) to the input shaft 12 to rotate therewith. Loading cams 36 serving as biasing means are arranged between the cam flange 34 and the first input toroidal disc 22, so that the torque of the input shaft 12 is transmitted to the first input toroidal disc 22 through the cam flange 34 and the loading cams 36.

The loading cams 36 are constructed to increase an expanding force, which is applied between the cam flange 34 and the first input toroidal disc 22, in accordance with the magnitude of torque possessed by the input shaft 12. That is, during a torque transmitting operation, there is produced a relative but slight rotation (or phase shift) between the cam flange 34 and the first input toroidal disc 22 turning the loading cams 36 about their axes.

Thus, when torque is transmitted from the cam flange 34 to the first input toroidal disc 22, the loading cams 36 are actuated to bias the first input toroidal disc 22 toward the first output toroidal disc 24 thereby increasing the contact force with which the input and output toroidal discs 22 and 24 are engaged with the first paired traction rollers 26.

The cam flange 34 is connected to the input shaft 12 through a stopper 38 and a nut 38a, so that a counterforce generated when the loading cams 36 press against the first input toroidal disc 22 is applied to the input shaft 12.

The torque applied to the first input toroidal disc 22 is transmitted to the second input toroidal disc 22a through the torque shaft 28. At an axially outer side of the second input toroidal disc 22a, there is arranged a biasing means for biasing the second input toroidal disc 22a toward the second output toroidal disc 24a. The biasing means comprises a disc spring 42 which is compressed between the input disc 22a and a spacer 100 which is, in turn, connected through a needle thrust bearing 102 to a nut 40 which is screwed to the input shaft 12. A counterforce of the biasing force is thus applied through the nut 40 to the input shaft 12.

The counterforce of the loading cams 36 and that of the disc spring 42 are thus transmitted to the second input toroidal disc 22a and the first input toroidal disc 22 respectively through the axially movable input shaft 12.

Accordingly, the biasing force produced by the disc spring 42 is applied to the first motion transmitting traction mechanism 20 as well as the second motion transmitting traction mechanism 20a, and the biasing force produced by the loading cams 36 is applied to the second motion transmitting traction mechanism 20a as well as the first motion transmitting traction mechanism 20.

Because the first and second output toroidal discs 24 and 24a are connected through the serrations 32b and 32c to the output gear 32, the torque transmitted to the first output toroidal disc 24 and that transmitted to the second output toroidal disc 24a are united at the output gear 32 and then the united torque is transmitted to an output shaft 46 (or second shaft) through a drive gear 44 which is meshed with the output gear 32.

As is shown in FIG. 1, the output shaft 46 is placed in the rear cavity B of the casing 14. That is, the output shaft 46 has no portion which extends through the front cavity A of the casing 14. The output shaft 46 is arranged in parallel with the input shaft 12. A left end (as viewed in this drawing) of the output shaft 46, to which the drive gear 44 is secured, is rotatably held by the partition wall 18 through a bearing 45.

An oil cover 44a is arranged to cover a lower part of the drive gear 44. With this oil cover 44a, the resistance of oil against rotation of the drive gear 44 in the oil is lowered.

As is well shown in FIG. 1, the output gear 32 is received in a space which is defined by both an apertured portion of the partition wall 18 and an apertured auxiliary wall 50 secured by bolts 48 to the partition wall 18. Within the apertures, there are arranged respective angular ball bearings 52 and 52a which are, in turn, coaxially disposed about the front and rear hub portions 32a of the output gear 32. Thus, the output gear 32 is supported by the partition wall 18 through the angular ball bearings 52 and 52a.

A spacer 54 or 54a is disposed between an inner race of the bearing 52 or 52a and the output gear 32, and a shim 56 or 56a is disposed between the inner race and the first or second output toroidal disc 24 or 24a, so that the positioning between the first and second output toroidal discs 24 and 24a is achieved.

As is understood from the drawings, the paired traction rollers 26 or 26a are arranged at opposite sides with respect to the input shaft 12. As is seen from FIG. 2, each traction roller 26 or 26a has a curved peripheral portion which is smoothly engaged with the toroidal surfaces of the input and output toroidal discs 22 and 24 (or, 22a and 24a).

The first and second paired traction rollers 26 and 26a are pivotally supported by first and second supporting mechanisms 58 and 58a respectively.

Since the first and second supporting mechanisms 58 and 58a are substantially the same in construction, the following description will be directed to only the second supporting mechanism 58a to avoid repeated explanation.

Figure 2:
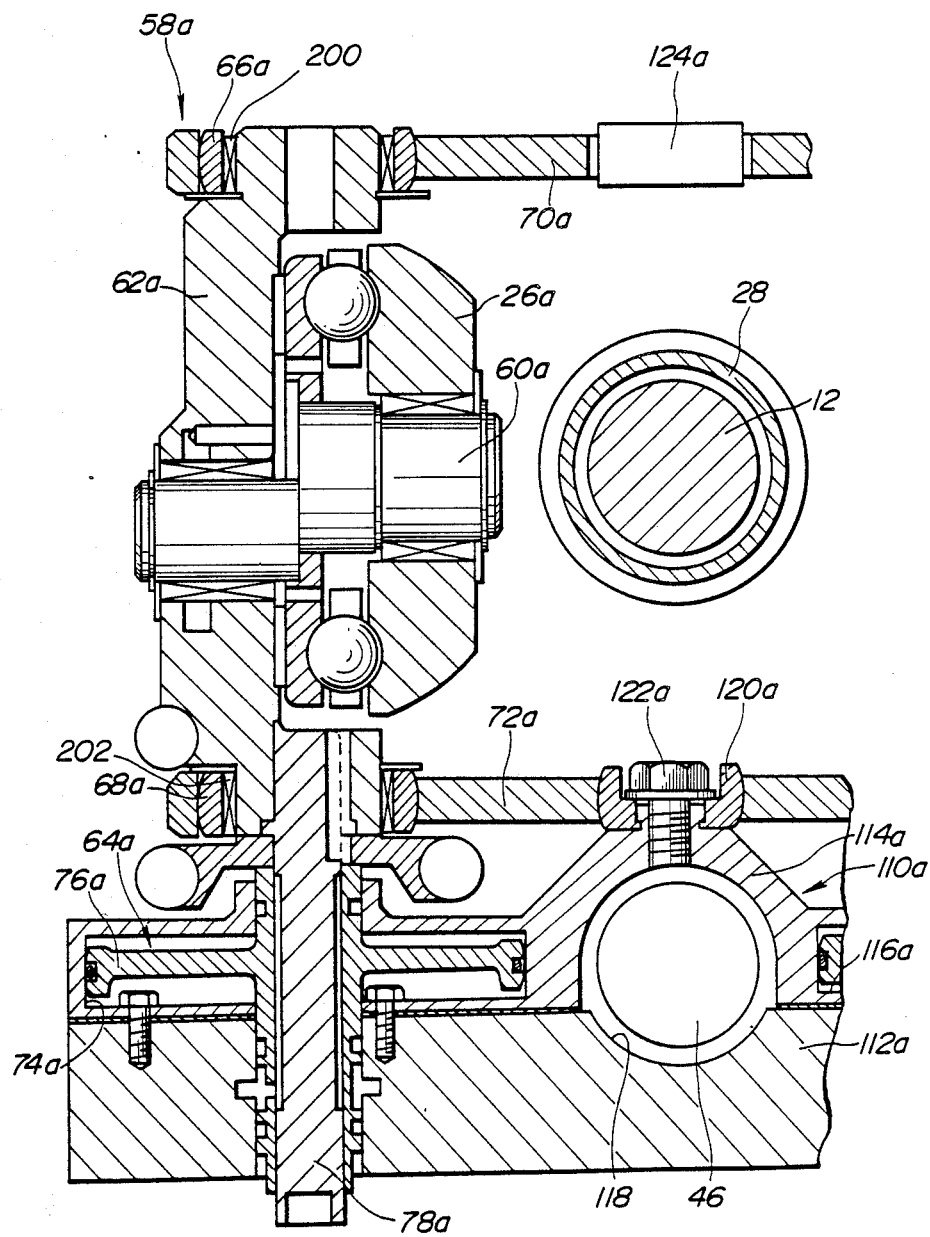
FIG. 2 is a sectional view taken along the line II—II of FIG. 1.

Referring to FIG. 2, there is partially shown the second supporting mechanism 58a, which is a view taken along the line II—II of FIG. 1.

The second supporting mechanism 58a comprises two idential units (only one is shown in FIG. 2) which are arranged at opposite sides with respect to the input shaft 12, each unit including an eccentric shaft 60a on which the traction roller 26a is rotatably supported, a supporting member 62a to which the eccentric shaft 60a is pivotally connected, and a hydraulic actuator 64a which moves the supporting member 62a in direction perpendicular to the axis of the eccentric shaft 60a.

A first portion of the eccentric shaft 60a on which the traction roller 26a is rotatably disposed and a second portion of the shaft 60a which is rotatably connected to the supporting member 62a are eccentric to each other. The eccentricity of one eccentric shaft 60a is reversed to that of the other eccentric shaft 60a.

Each supporting member 62a has upper and lower ends rotatably and inclinably supported through spherical bearings 66a and 68a by upper and lower links 70a and 72a respectively. In addition, needle bearings 200 and 202 allow each supporting members 62a to rotate relative to upper and lower links 70a and 72 a.

Each hydraulic actuator 64a comprises a cylinder 74a, a piston 76a and a piston rod 78. The piston rod 78a is connected to the supporting member 62a to move together.

Due to the nature of the reversedly mounted eccentric shafts 60a, the two piston rods 78a of respective units are permited to move in opposite directions in response to an application of control hydraulic pressure from a second control valve (not shown).

Accordingly, when the two hydraulic actuators 64a are operated by the hydraulic pressure, the two supporting members 62a are moved in opposite directions bringing about inclination of the upper and lower links 70a and 72a.

With this, the two traction rollers 26a sandwiched between the input and output toroidal discs 22a and 24a are forced to incline about respective axes which are parallel with the piston rods 78a of the hydraulic actuators 64a.

As has been described hereinafore, the first supporting mechanism 58 has substantially the same construction as the above-mentioned second supporting mechanism 58a. Thus, as will be understood from FIG. 1, when a hydraulic actuator (not shown) of the first supporting mechanism 58 is operated by a first control valve (not shown), the two traction rollers 26 are inclined in substantially the same manner as the traction rollers 26a of the second supporting mechanism 58a.

It is to be noted that since the first and second motion transmitting traction mechanisms 20 and 20a are arranged in opposed manner, the corresponding parts of the first and second supporting mechanisms 58 and 58a are moved in opposite directions.

The above-mentioned first and second valves are respectively installed in first and second valve body structures 110 and 110a which are placed in the front and rear cavities A and B of the casing 14. Each valve body structure 110 or 110a comprises a lower body 112 or 112a and an upper body 114 or 114a which are combined, by bolts, with an interposal of a separate plate 116 or 116a therebetween.

As is seen from FIG. 1, the first valve body structure 110 is positioned in the front cavity A below the first motion transmitting traction mechanism 20, while, the second valve body structure 110a is positioned in the rear cavity B below the second motion transmitting traction mechanism 20a where the output shaft 46 is located.

As is well shown in FIG. 2, the lower and upper bodies 112a and 114a of the second valve body structure 110a define therebetween a cylindrical passage 118 through which the output shaft 46 passes. The upper body 114a is formed at its left and right portions, as viewed in FIG. 2, with the respective cylinders 74a of the hydraulic actuators 64a. The upper body 114a further has a raised middle portion to which a link post 120a is connected through a bolt 122a. The link post 120a is engaged with an opening formed in a middle part of the lower link 120a, so that the lower link 120a is inclinably held by the upper body 114a.

It is to be noted that the upper link 70a is inclinably held by a part of the casing 14 through another link post 124a.

Similar to the second valve body structure 110a, the first valve body structure 110 has at the upper body 114 the two cylinders (74) of the hydraulic actuators (64) for the first supporting mechanism 58. As is seen from FIG. 1, the upper body 114 has a link post 120 bolted thereto. The link post 120 is engaged with the lower link 72, so that the lower link 120 is inclinably held by the upper body 114. The upper link 70 is inclinably held by a part of the casing 14 through another link post 124.

In the following, operation will be described with reference to the drawings.

For ease of understanding, the description will be commenced with respect to a rest condition of the transmission 10 wherein an engine incorporated with the transmission 10 is at a standstill and thus there is no torque applied to the input shaft 12.

Under this rest condition, the biasing force produced by the disc spring 42 is applied to the first and second input toroidal discs 22 and 22a, so that the first paired traction rollers 26 are pressed by the first input and output toroidal discs 22 and 24 with a certain biasing force, and at the same time, the second paired traction rollers 26a are pressed by the second input and output toroidal discs 22a and 24a with a certain biasing force.

When, upon starting of the engine, a certain torque is applied to the input shaft 12, the same is transmitted through the cam flange 28 and the loading cams 36 to the first input toroidal disc 22 and through the torque shaft 28 to the second input toroidal disc 22a causing rotation of the first and second input toroidal discs 22 and 22a.

The torque applied to the first and second input toroidal discs 22 and 22a is transmitted through the first and second paired traction rollers 26 and 26a to the first and second output toroidal discs 24 and 24a. Under this condition, the speed change ratio between the input and output toroidal discs 22 and 24 (or, 22a and 24a) is infinitely varied depending on an inclination angle which the paired traction rollers 26 (or 26a) assume.

During the torque transmitting from the input shaft 12 to the first input toroidal disc 22, there is produced a relative but slight rotation (or phase shift) between the cam flange 34 and the first input toroidal disc 22 thereby turning the loading cams 36 about their axes increasing their effective widths. Thus, the first input toroidal disc 22 is biased toward the first output toroidal disc 24, and at the same time, a counterforce produced by the disc 22 is applied through the input shaft 12 to the second input toroidal disc 22a.

Accordingly, the pressing or contact force with which each toroidal disc 22, 24, 22a or 24a is pressed against the corresponding paired traction rollers 26 or 26a is increased and thus undesired slippage therebetween is suppressed or at least minimized.

The torque thus applied to both the first and second output toroidal discs 24 and 24a is transmitted through the output gear 32 and the drive gear 44 to the output shaft 46 from which the torque is transmitted to a final drive device (not shown) through a suitable clutch mechanism (not shown). When the transmission 10 of the invention is applied to a motor vehicle, the clutch mechanism may comprise a forward clutch and a backward clutch.

As is described hereinabove, in accordance with the present invention, the output shaft 46 has no portion which is located in front cavity A of the transmission casing 14, both the first and second control valve structures 110 and 110a are installed in the transmission casing 14, and the second control valve structure 110a is formed with the passage 118 through which the output shaft 46 passes.

It is to be noted that providing the passage 118 in the second control valve structure 110a for accommodating the output shaft 46 does not cause any need of enlarging the internal space of the casing 14, more specifically, the rear cavity B of the same. In other words, the provision of the output shaft 46 does not cause any enlargement in size of the transmission. Thus, unlike the case of the afore-mentioned conventional transmissions, the transmission according to the present invention can be constructed compact in size.

What is claimed is:

1. A continuously variable traction roller transmission of a double cavity type, comprising:
   a casing;
   a partition wall installed in said casing to define front and rear cavities in the same;
   a first shaft extending through said front and rear cavities;
   first and second motion transmitting traction mechanisms respectively installed in said front and rear cavities, each mechanism being disposed about said first shaft and operatively connected to the same;
   first and second control valve body structures respectively installed in said front and rear cavities, each structure producing a hydraulic pressure for controlling the corresponding motion transmitting traction mechanism;
   a second shaft extending through only said rear cavity; and
   means for operatively connecting said second shaft to both of said first and second motion transmitting traction mechanisms,
   wherein said second control valve body structure has a passage through which said second shaft is passed.

2. A continuously variable traction roller transmission as claimed in claim 1, in which said first shaft is an input shaft adapted to connect to a torque converter and said second shaft is an output shaft adapted to connect to a final drive means.

3. A continuously variable traction roller transmission as claimed in claim 2, in which said first and second motion transmitting traction mechanisms are arranged oppositely.

4. A continuously variable traction roller transmission as claimed in claim 3, in which said second control valve body structure comprises a lower body and an upper body which are combined with an interposal of a separate plate therebetween.

5. A continuously variable traction roller transmission as claimed in claim 4, in which said lower and upper bodies respectively have rounded grooves which are mated to form said passage when said upper and lower bodies are combined.

6. A continuously variable traction roller transmission as claimed in claim 5, in which said passage is cylindrical in shape.

7. A continuously variable traction roller transmission as claimed in claim 6, in which said upper body is formed with part of hydraulic actuators by which said first and second motion transmitting traction mechanisms are moved in response to application of hydraulic pressure applied thereto from said first and second control valve body structures.

8. A continuously variable traction roller transmission as claimed in claim 7, in which said part comprises respective cylinders in which pistons are sealingly received.

9. A continuously variable traction roller transmission as claimed in claim 3, in which each of said first and second motion transmitting traction mechanisms comprises input and output toroidal discs which are disposed about the input shaft in a manner to face each other and paired traction rollers which are disposed between and in engagement with said input and output toroidal discs having the input shaft placed therebetween.

10. A continuously variable traction roller transmission as claimed in claim 3, in which said means comprises an output gear rotatably held by said partion wall and a drive gear meshed with said output gear, said drive gear being secured to said second shaft to rotate therewith.

11. A continuously variable traction roller transmission of a double cavity type, comprising:
    a casing;
    a partition wall installed in said casing to define front and rear cavities in the same;
    a first shaft extending through said front and rear cavities;
    first and second motion transmitting traction mechanism respectively installed in said front and rear cavities, each mechanism being disposed about said first shaft and operatively connected to the same;
    a control valve body structure installed in said casing, said structure producing a hydraulic pressure for controlling at least one of said first and second motion transmitting traction mechanisms;
    a second shaft extending through only said rear cavity; and
    means for operatively connecting said second shaft to both of said first and second motion transmitting traction mechanisms,
    wherein said control valve body structure has a passage through which said second shaft is passed.

* * * * *